United States Patent
Rico Alvarino et al.

(10) Patent No.: US 11,057,250 B2
(45) Date of Patent: *Jul. 6, 2021

(54) PHASE ROTATION FOR IN-BAND SIGNAL GENERATION FOR NARROW BAND TRANSMISSION

(71) Applicant: QUALCOMM Incorporated, San Diego, CA (US)

(72) Inventors: Alberto Rico Alvarino, San Diego, CA (US); Chun-Hao Hsu, San Jose, CA (US); Xiao Feng Wang, San Diego, CA (US); Peter Gaal, San Diego, CA (US); Lei Xiao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/427,045

(22) Filed: May 30, 2019

(65) Prior Publication Data

US 2019/0288888 A1 Sep. 19, 2019

Related U.S. Application Data

(63) Continuation of application No. 15/445,263, filed on Feb. 28, 2017, now Pat. No. 10,313,167.

(Continued)

(51) Int. Cl.
*H04W 4/00* (2018.01)
*H04L 27/20* (2006.01)
(Continued)

(52) U.S. Cl.
CPC .......... *H04L 27/2082* (2013.01); *H04L 5/003* (2013.01); *H04L 5/005* (2013.01);
(Continued)

(58) Field of Classification Search
None
See application file for complete search history.

(56) References Cited

U.S. PATENT DOCUMENTS 9,369,371 B2 6/2016 Filsfils et al.
10,313,167 B2 6/2019 Rico et al.
(Continued)

FOREIGN PATENT DOCUMENTS

CN 1607787 A 4/2005
WO 2015188848 A1 12/2015

OTHER PUBLICATIONS

Intel Corporation: "Baseband Signal Generation for NB-IoT Downlink," R1-162977, 3GPP TSG RAN WG1 Meeting #84bis, Busan, South Korea, Apr. 11-15, 2016, Retrieved from the Internet URL: http://www.3gpp.org/ftp/tsg_ran/WG1_RL1/TSGR1_84b/Docs/R1-162977.zip , 5 Pages.

(Continued)

*Primary Examiner* — Clemence S Han
(74) *Attorney, Agent, or Firm* — Nerrie M. Zohn

(57) ABSTRACT

In order to enable a UE receiving a narrowband signal transmitted using in-band resources to use the LTE reference signals to assist the UE in receiving the narrowband signal using an in-band deployment, a phase rotation employed by the base station may be fixed relative to a known reference position in time. An apparatus for wireless communication at a base station may determine a phase offset for a narrowband signal for transmission using wideband resources, the phase offset having a relationship to a reference point in time and transmit the narrowband signal using the determined phase offset. An apparatus for wireless communication at a UE may receive a narrowband signal having a frequency location within a wideband signal and rotate a symbol of the wideband signal by a per symbol phase offset having a relationship of the phase offset to a reference point in time.

32 Claims, 10 Drawing Sheets

Related U.S. Application Data

(60) Provisional application No. 62/377,434, filed on Aug. 19, 2016.

(51) Int. Cl.
| | | |
|---|---|---|
| *H04L 5/00* | (2006.01) | |
| *H04L 27/26* | (2006.01) | |
| *H04W 4/70* | (2018.01) | |
| *H04L 25/02* | (2006.01) | |

(52) U.S. Cl.
CPC .......... *H04L 5/0007* (2013.01); *H04L 5/0048* (2013.01); *H04L 27/2602* (2013.01); *H04L 27/2657* (2013.01); *H04W 4/70* (2018.02); *H04L 25/0202* (2013.01); *H04L 27/2627* (2013.01)

(56) References Cited

U.S. PATENT DOCUMENTS

| | | | | |
|---|---|---|---|---|
| 2010/0273438 A1* | 10/2010 | Nishio | .................. | H04L 5/0023 455/101 |
| 2016/0006538 A1* | 1/2016 | Yoshida | ............. | H04B 10/2543 398/65 |
| 2017/0093540 A1 | 3/2017 | Lei et al. | | |
| 2017/0135052 A1* | 5/2017 | Lei | ...................... | H04J 13/0062 |
| 2018/0278355 A1* | 9/2018 | Shin | ...................... | H04L 5/0048 |

OTHER PUBLICATIONS

Taiwan Search Report—TW106127941—TIPO—dated Jan. 21, 2020.
Intel Corporation: "NB-IoT Reference Signal Design", 3GPP Draft; R1-160412—Intel NB-IOT NB-RS, 3rd Generation Partnership Project (3GPP), Mobile Competence Centre; 650, Route Des Lucioles; F-06921 Sophia-Antipolis Cedex; France, vol. RAN WG1, No. St Julian's, Malta; Feb. 15, 2016-Feb. 19, 2016 Feb. 6, 2016, XP051064171, Retrieved from the Internet: URL:http://www.3gpp.org/ftp/tsg_ran/WG1_RL1/TSGR1_84/Docs/ [retrieved on Feb. 6, 2016], 4 pages.
International Search Report and Written Opinion—PCT/US2017/047423—ISA/EPO—dated Nov. 14, 2017.
Samsung: "Remaining Details of NB-MIB Design", 3GPP Draft; R1-161925 NB-MIB, 3rd Generation Partnership Project (3GPP), Mobile Competence Centre; 650, Route Des Lucioles; F-06921 Sophia-Antipolis Cedex; France, vol. RAN WG1, No. Sophia Antipolis, France, Mar. 16 2016, XP051081042, Retrieved from the Internet: URL:http://www.3gpp.org/ftp/tsg_ran/WG1_RL1/TSGR1_AH/LTE_NB-IoT_1603/Docs/ [retrieved on Mar. 16, 2016], 5 pages.

* cited by examiner

PHASE ROTATION FOR IN-BAND SIGNAL GENERATION FOR NARROW BAND TRANSMISSION

CROSS-REFERENCE TO RELATED APPLICATION

The present Application for Patent is a Continuation application of U.S. patent application Ser. No. 15/445,263, entitled "PHASE ROTATION FOR IN-BAND SIGNAL GENERATION FOR NARROW BAND TRANSMISSION," filed Feb. 28, 2017, claims the benefit of U.S. Provisional Application Ser. No. 62/377,434, entitled "Phase Rotation For In-Band Signal Generation For Narrow Band Transmission" and filed on Aug. 19, 2016, which is expressly incorporated by reference herein in its entirety.

BACKGROUND

Field

The present disclosure relates generally to communication systems, and more particularly, to phase rotations for narrow band signal generation within a wider band signal.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In narrowband (NB) wireless communication, such as narrow band internet-of-things (NB-IoT) or enhanced Machine-Type Communications (eMTC), wireless communications may be limited to a reduced amount of resources. For example, in NB-IoT, wireless communication is limited to a single Resource Block (RB). In eMTC, communication is limited to six RBs. Such limited resources lead to unique challenges in transmitting data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a standalone deployment, NB communication may be transmitted using resource blocks within a dedicated spectrum. In-band NB communication may be transmitted utilizing resource blocks within another carrier (e.g., LTE carrier), and a guard band deployment may transmit NB communication in the unused resource blocks within another carrier's guard-band. As NB-IoT transmissions are limited to a single physical resource block (PRB), an in-band NB-IoT transmission may be generated using on PRB of wideband resources (e.g., LTE resources) to transmit the NB-IoT transmission. A base station transmitting wideband signals may replace one carrier with a NB signal. This enables the base station to generate a baseband signal using a single Inverse Discrete Fourier Transform (IDFT), by multiplexing the NB symbols in the frequency domain with the corresponding wideband resource elements.

However, a wideband signal may have a different center frequency than the center frequency of the NB signal transmitted within the wideband resources. For example, the center frequency of an LTE signal is the center of all of the LTE PRBs, whereas the center frequency of an NB-IoT signal is the center of the specific PRB used for the NB-IoT. A User Equipment (UE) uses the frequency center for demodulation of the signal that it receives from the base station.

It may be problematic for the base station to multiplex the NB symbols in the frequency domain of the corresponding wideband resource elements due to the difference in the center of frequency which causes a phase difference between different OFDM symbols. The base station may correct the phase offset between the two signals before transmission by rotating symbols of the NB signal by a phase offset.

A UE receiving the NB signal may not be aware that the NB signal is an in-band signal rather than a standalone signal. The UE may be able to demodulate the NB signal, regardless of the phase rotation applied by the base station. However, the UE will not be able to use wideband reference signals in order to help it receive the NB signal.

In order to enable a UE to use the wideband reference signals to assist the UE in receiving a NB signal using an in-band deployment, the phase rotation used by the base station may be fixed relative to a known reference position in time. The UE may then use the relationship of a symbol comprising a wideband reference signal to the reference position to apply a phase rotation to the wideband reference signal. By applying the phase rotation to the wideband reference signal, the UE effectively undoes the effect of the phase rotation that the base station applied to the NB signal. This enables the UE to use the LTE reference signal along with a NB reference signal to demodulate the NB signal.

In an aspect of the disclosure, a method, a computer-readable medium, and an apparatus for wireless communication at a base station are provided. The apparatus determines a phase offset for a NB signal for transmission using wideband resources, the phase offset having a relationship to a reference point in time. Then, the apparatus transmits the NB signal using the determined phase offset. The reference point may comprise a reference symbol in the wideband resources, such as a start of a last even numbered subframe. The relationship may correspond to an index relative to the reference symbol.

The apparatus may also generate a first symbol of the NB signal in the frequency domain, multiply the first symbol of the NB signal by a first determined phase offset, and multiplex the first symbol of the NB signal within a wideband symbol of a wideband signal in the frequency domain, wherein transmitting the NB signal comprises transmitting the multiplexed signal. The phase offset may be based on a frequency separation between a first frequency center of the NB signal and a second frequency center of the wideband signal and on a symbol index indicating a number of symbols from the reference point in time.

In another aspect of the disclosure, a method, a computer-readable medium, and an apparatus for wireless communication at a UE are provided. The apparatus receives a NB signal having a frequency location within a wideband signal and rotates a symbol of the wideband signal by a per symbol phase offset having a relationship to a reference point in time. The apparatus may determine an operation mode for NB signal reception before determining to rotate the symbol of the wideband signal. The symbol of the wideband signal may be a wideband reference signal that is rotated relative a corresponding NB reference signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
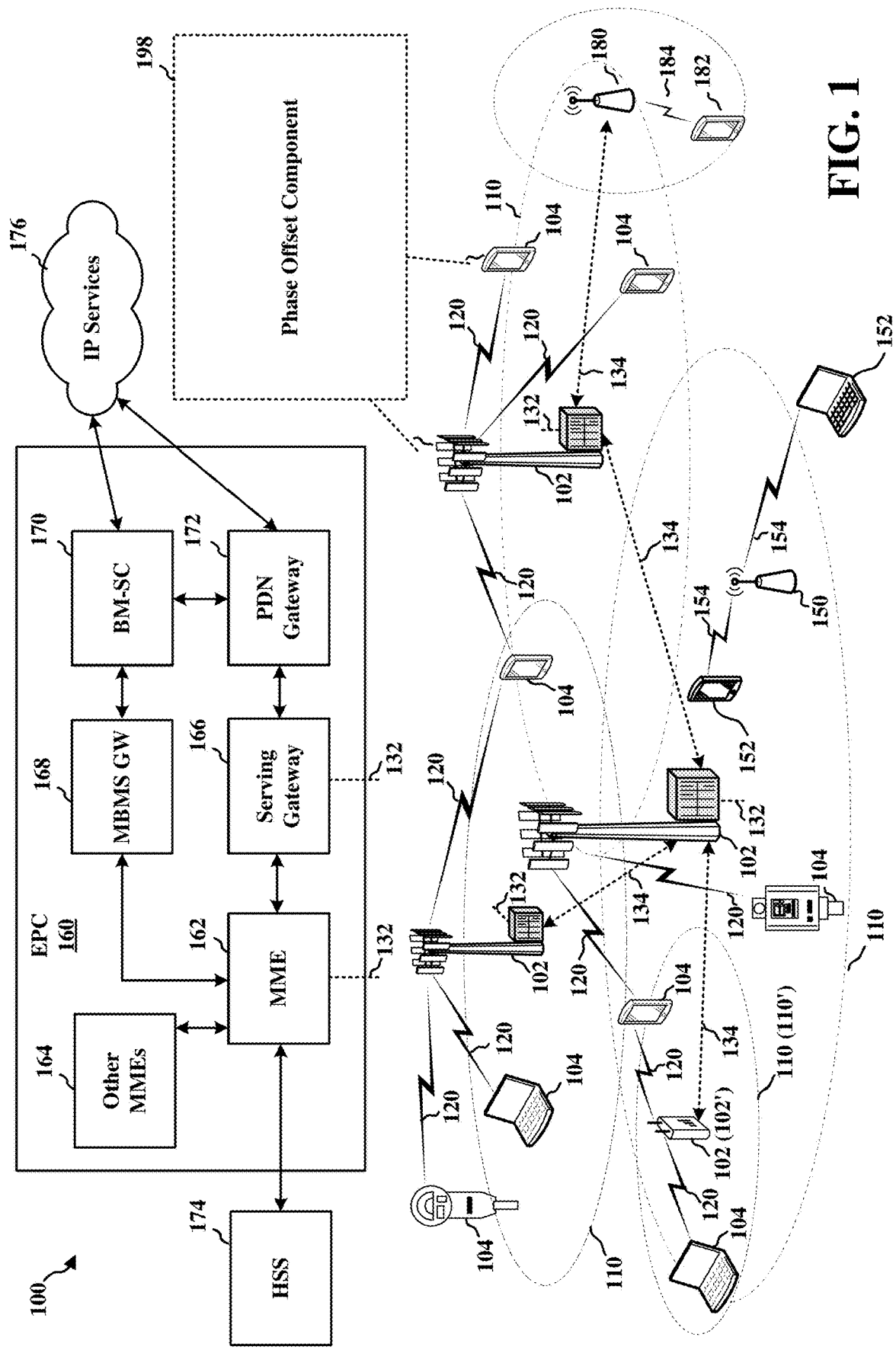
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies to communicate with UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104, eNB 102, or other base station may be configured to perform a phase rotation to at least a part of a signal comprising a NB signal transmitted in-band with a wideband signal. For example, UE 104 and/or eNB 102 may include a phase rotation component (198), as described in connection with FIGS. 4-10.

Figure 2:
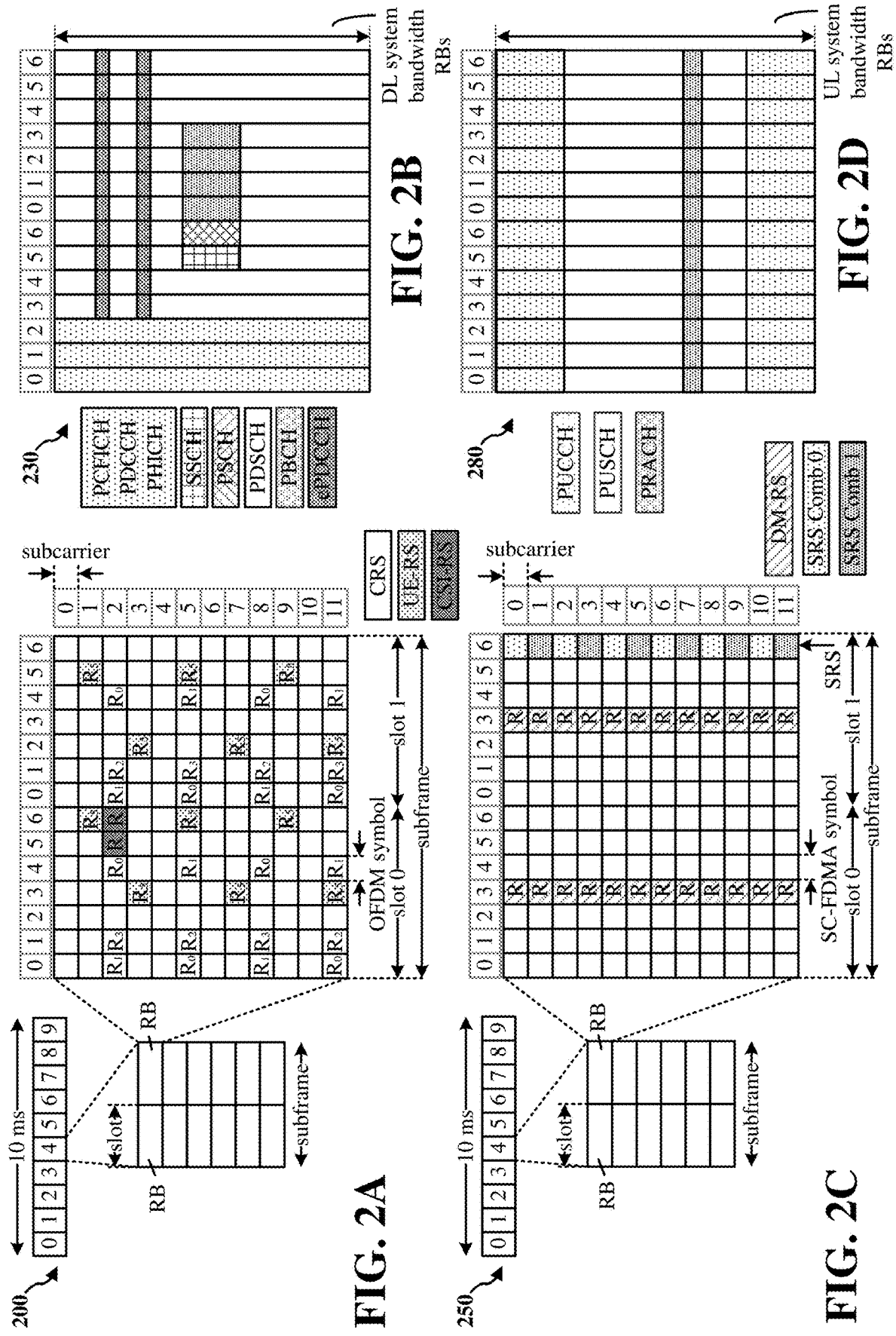
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physi-cal uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
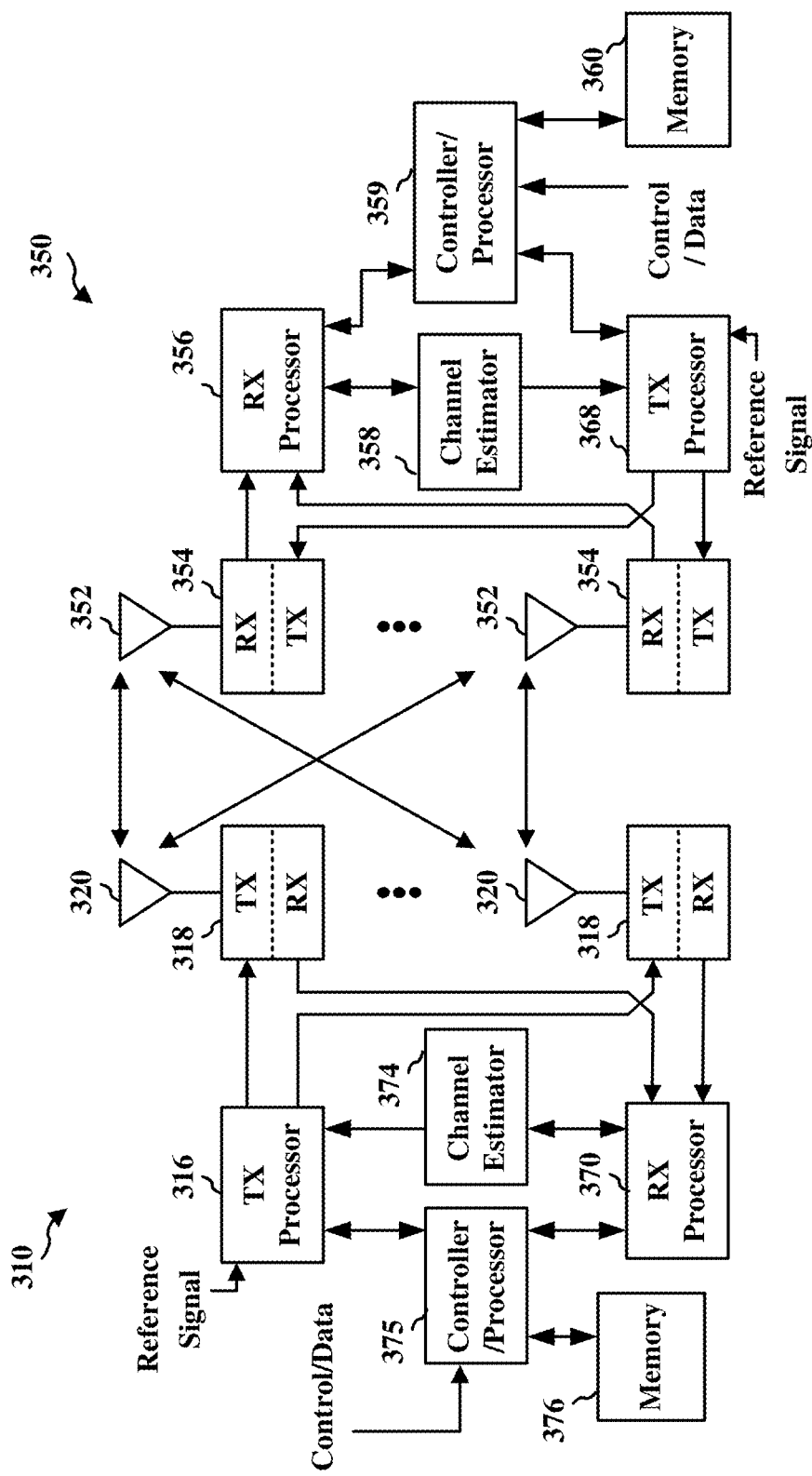
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

NB wireless communication involves unique challenges due to the limited frequency dimension of the narrow band. One example of such NB wireless communication is NB-IoT, which is limited to a single resource block (RB) of system bandwidth, e.g., using 180 kHz of bandwidth. Another example of NB wireless communication is eMTC, which is limited to six RBs of system bandwidth. This narrow band communication may be deployed "in-band," utilizing resource blocks within another carrier (e.g., an LTE carrier), or in the unused resource blocks within another carrier's guard-band, or standalone for deployments in dedicated spectrum. Multiple users ( e.g., UEs) may utilize the narrow band. While only some of the UEs may be active at a particular time, the NB communication should support such multi-user capacity.

Additionally, NB communication may need to provide for deep coverage, by accounting for devices in environments requiring different Coverage Enhancement (CE) levels. For example, some devices may need as much as 20 dB of CE, which results in greater uplink Transmission Time Interval (TTI) bundling, further limiting time resources. NB-IoT communication may also involve a large cell radius, e.g., as much as approximately 35 km. Thus, the communication may involve a long delay, such as 200 μs, which may employ a long Cyclic Prefix (CP) length.

A NB transmission (e.g., NB-IoT) may be generated using an in-band deployment mode by using 1 PRB of wideband resources (e.g., LTE resources) to transmit the NB transmission. A base station transmitting wideband signals may embed an NB signal in a wideband carrier. This enables the base station to generate a baseband signal using a single IDFT, by multiplexing the NB symbols in the frequency domain with the corresponding wideband resource elements.

The wideband signal may have a different center frequency than the center frequency of the NB PRB within the wideband resources. For example, the center frequency of an LTE signal is the center of all of the LTE PRBs, whereas the center frequency of an NB-IoT signal is the center of the specific PRB used for the NB-IoT. Due to different center frequency of the NB PRB with respect to the wideband signal, there may be a phase offset between different OFDM symbols. The eNB may correct this phase offset before transmission by rotating symbols of the NB signal by a phase offset. This may cause the NB signal to be similar to a standalone deployment.

A UE receiving the NB signal may not be aware that the NB signal is an in-band signal rather than a standalone signal. The UE may be able to demodulate the NB signal, regardless of the phase rotation applied by the base station. However, the UE will not be able to use wideband reference signals in order to help it receive the NB signal.

In order to enable a UE to use the wideband reference signals to assist the UE in receiving a NB signal using an in-band deployment, the phase rotation used by the base station may be fixed relative to a known reference position in time. The UE may then use the relationship of a symbol comprising a wideband reference signal to the reference position to apply a phase rotation to the wideband reference signal. By applying the phase rotation to the wideband reference signal, the UE effectively undoes the effect of the phase rotation that the base station applied to the NB signal. This enables the UE to use the LTE reference signal along with a NB reference signal to demodulate the NB signal, e.g., enabling a receiving UE to perform joint processing of NB-IoT Reference Signals (NRS) and LTE reference signals, e.g., cell-specific reference signal (CRS).

As the frequency difference between LTE and NB-IoT is 15*N+7.5 kHz or 15*N+2.5 kHz, the phase difference may be reset every 2 ms, e.g., every 2 subframes. For example, any sinusoid with frequency of the form N+0.5 kHz, with an N integer, will have an integer number of cycles every 2 ms. Thus, a phase relationship may be introduced with respect to a given reference point of time between the LTE signal and the NB-IoT signal. A reference point instance may occur every 2 subframes. Therefore, the base station may apply a pattern of per symbol phase rotations that repeats every 2 subframes.

In one example, the NB signal may comprise an NB-IoT signal and the wideband signal may comprise an LTE signal. In this example, the NB-IoT signal and the LTE signal may have the same phase in the first OFDM symbol of every two subframes. Then, the phase rotation parameters may be defined based on the CP length, symbol position and difference between the NB-IoT carrier frequency and the LTE carrier frequency, etc.

Figure 10:
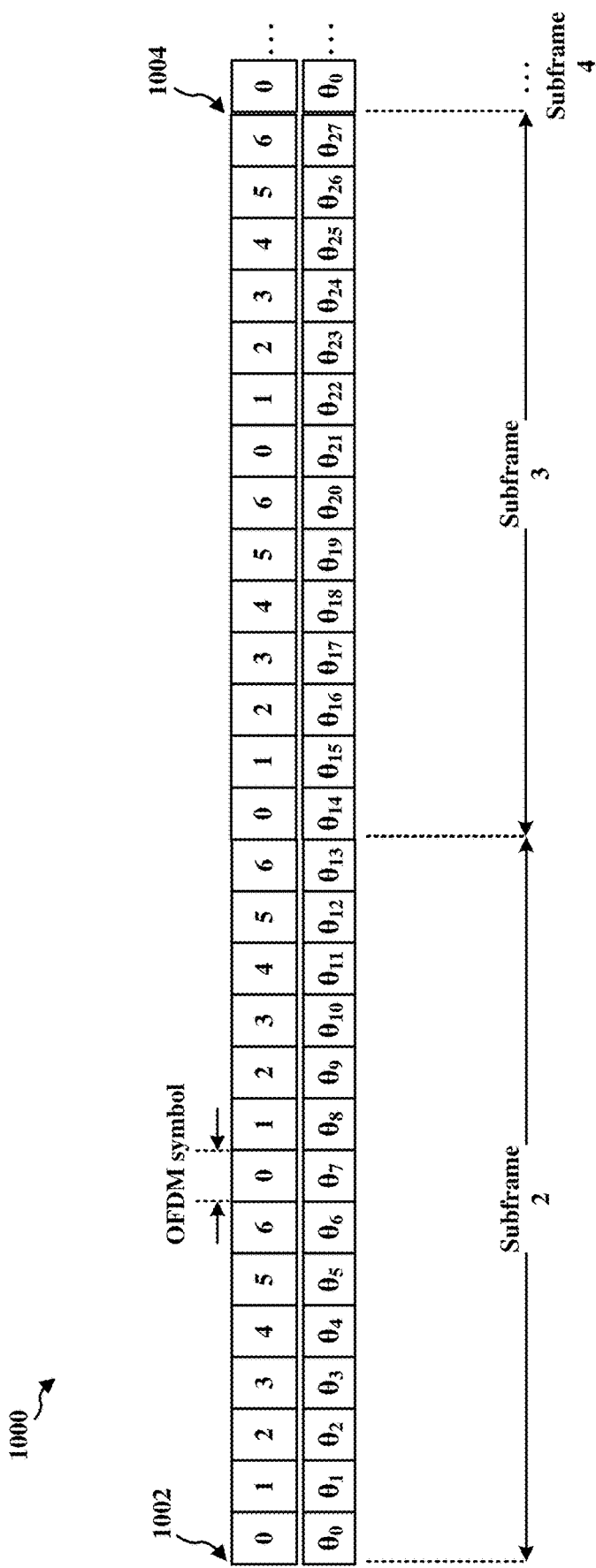
FIG. 10 is a diagram illustrating an example pattern of per symbol phase offsets.

FIG. 10 illustrates an example pattern 1000 of phase rotation that may be applied per symbol to the NB signal, e.g., NB-IoT signal. A reference point may be a start of each even numbered subframe. Thus, the start of symbol 0 of subframe 2 may be a first reference point instant 1002 and the start of symbol 0 of subframe 4 may be a second reference point instant 1004. Therefore, a receiving UE may determine the phase rotation using the start of a last even numbered subframe as the reference point. The first row in FIG. 10 illustrates a symbol number for the OFDM symbols of subframes 2 and 3. The second row in FIG. 10 indicates a respective phase rotation θ that may be applied on a per symbol basis to each symbol during a period comprising two subframes, e.g., subframes 2 and 3. As illustrated in FIG. 10, a different phase rotation may be applied to each of the symbols within the period between two reference point instances, e.g., between 1002 and 1004. At the beginning of subframe 4, which is a second reference point instance in time 1004, the pattern of per symbol phase rotation may be repeated for subframes 4 and 5. As illustrated, the phase rotation $\theta_0$ applied to the first symbol of subframe 2 may be applied to the first symbol of subframe 4. Then, $\theta_1$, which was applied to the second symbol of subframe 2, may be applied to the second symbol of subframe 4, and so forth. Although not illustrated, the start of subframe 6 may comprise a third reference point instant and the same pattern of phase rotations illustrated for subframes 2 and 3 may be applied on a per symbol basis for subframes 6 and 7, and so forth. The various phase rotations $\theta_0$ to $\theta_{27}$ may be calculated based on a frequency difference between the location of the center of the NB signal and the center of the wideband signal and the symbol index, e.g., using the formulas indicated infra.

For example, a baseband generation for NB-IoT may be defined as:

$$s_{l'}^{(p)}(t) = \sum_{k=-\lfloor N_{sc}^{RB}/2 \rfloor}^{\lceil N_{sc}^{RB}/2 \rceil - 1} a_{k(-),l}^{(p)} \cdot e^{j2\pi(k+1/2)\Delta f(t-N_{CP,l}T_s)} \quad (1)$$

In this equation, $S_{l'}^{(p)}(t)$ is a time-continuous signal on antenna port p in OFDM symbol l', $a_{k,l'}^{(p)}$ is the content of resource element (k, l') with k being the subcarrier index and l' being the symbol index, counted from the start of the last even subframe, $N_{CP}$ is the number of samples of the CP and $T_s$ is the sampling frequency, and $N_{sc}^{RB}$ is the number of subcarriers per RB (i.e., 12).

The center frequency (DC) for this signal may be between the center two resource elements, there being a half-tone shift. The baseband signal for LTE may be defined as:

$$s_{l}^{(p)}(t) = \sum_{k=-\lfloor N_{RB}^{DL}N_{sc}^{RB}/2 \rfloor}^{-1} a_{k(-),l}^{(p)} \cdot e^{j2\pi k \Delta f(t-N_{CP,l}T_s)} + \sum_{k=1}^{\lceil N_{RB}^{DL}N_{sc}^{RB}/2 \rceil} a_{k(+),l}^{(p)} \cdot e^{j2\pi k \Delta f(t-N_{CP,l}T_s)} \quad (2)$$

In this equation, the DC can be seen to correspond to the center subcarrier. $N_{RB}^{DL}$ is the downlink bandwidth (in number of RBs) of the LTE cell.

If the NB-IoT baseband generation is generated according to equation (1) following the in-band generation for an LTE signal in equation (2), an additional symbol rotation may be needed. One possible approach is to define the transmit equation as equation (3)

$$s_l^{(p)}(t) = \sum_{k=-\lfloor N_{RB}^{DL} N_{sc}^{RB}/2 \rfloor}^{-1} \theta a_{k(-),l}^{(p)} \cdot e^{j2\pi k \Delta f(t - N_{CP,l} T_s)} + \sum_{k=1}^{\lceil N_{RB}^{DL} N_{sc}^{RB}/2 \rceil} \theta a_{k(+),l}^{(p)} \cdot e^{j2\pi k \Delta f(t - N_{CP,l} T_s)} \quad (3)$$

Where the phase θ is only applied to the NB-IoT REs, and may depend in a number of factors, e.g.:

(1) A frequency difference between the NB-IoT carrier and the LTE carrier, (2) A time instant in which the symbol is transmitted. For example, the phase difference may be reset every 2 subframes, and then θ depends on the number of symbols between the current symbol and the last even subframe.

The signal generation in equation (2) may be defined with respect to a symbol number in a slot. The generation using equation (2) may be extended to cover 2 subframes, for example, which is the periodicity of the frequency rotation between the LTE center frequency and NB-IoT center frequency.

The phase difference may be based on the total samples used for Cyclic Prefix (CP) and/or core OFDM symbol between the current OFDM symbol and last reference point (e.g. every two subframes). This phase difference may only be applied to NB-IoT REs, and not to LTE REs, in one example.

With this, the signal can be generated as follows.

The time-continuous signal $s_{l'}^{(p)}(t)$ on antenna port p in OFDM symbol l', where $l'=l+N_{symb}^{DL}$ ($n_s$ mod 4) ∈ {0, . . . , 27} is the OFDM symbol index from the start of the last even-numbered subframe, may be generated using equation (4):

$$s_{l'}^{(p)}(t) = \sum_{k=-\lfloor N_{RB}^{DL} N_{sc}^{RB}/2 \rfloor}^{-1} e^{\theta_{k(-),l'}} a_{k(-),l'}^{(p)} \cdot e^{j2\pi k \Delta f\left(t - N_{CP,l' \bmod N_{symb}^{DL}} T_s\right)} + \sum_{k=1}^{\lceil N_{RB}^{DL} N_{sc}^{RB}/2 \rceil} e^{\theta_{k(+),l'}} a_{k(+),l'}^{(p)} \cdot e^{j2\pi k \Delta f\left(t - N_{CP,l' \bmod N_{symb}^{DL}} T_s\right)}$$

for $0 \leq t < (N_{CP,l'}+N) \times T_s$ where $k^{(-)}=k+\lfloor N_{RB}^{DL} N_{sc}^{RB}/2 \rfloor$ and $k^{(+)}=k+\lfloor N_{RB}^{DL} N_{sc}^{RB}/2 \rfloor -1$, $$\theta_{k,l'} = j2\pi f_{NB-IoT} T_s \left( l'N + \sum_{i=0}^{l'} N_{CP,i \bmod 7} \right)$$

if resource element (k,l') is used for NB-IoT, and 0 otherwise, $f_{NB-IoT}$ is the frequency location of the center of the NB-IoT PRB measured with respect to the center of the LTE signal, and N is the number of samples in the core OFDM symbol (i.e., discounting the CP).

For example, for an NB-IoT carrier for which the higher layer parameter operationModeInfo does not indicate 'inband-SamePCI', for an NB-IoT carrier for which the higher layer parameter CarrierConfigDedicated-NB is present and no inbandCarrierinfo is present, or for an NB-IoT carrier for which the higher layer parameters CarrierConfigDedicated-NB and inbandCarrierinfo are present and the higher layers do not indicate $N_{ID}^{Ncell}$ is the same as $N_{ID}^{cell}$, then the time-continuous signal $s_l^{(p)}(t)$ on antenna port p in OFDM symbol l in a downlink slot may be defined by equation (1). Otherwise, the base station may transmit a time-continuous signal $s_{l'}^{(p)}(t)$ defined by equation (4).

As the per symbol phase offset applied to the NB signal is made with respect to a reference point in time, a UE may use its knowledge of the phase difference between CRS and NRS to correctly use both CRS and NRS for channel estimation.

A similar process to that described for the base station can be done at the UE side, e.g., with the UE performing a phase rotation for the wideband signal similar to the one performed by the base station for the NB signal. In this manner, the UE effectively removes the effect of the phase rotation applied by the base station and can demodulate the multiplexed signal that now has a same phase rotation for both the wideband signal and the NB signal. As the UE only needs the wideband reference signal, the UE may only rotate that portion of the wideband signal, e.g., CRS. This allows the UE to use the CRS along with NRS to receive the NB signal.

For example, the UE may downconvert the signal using the NB carrier frequency. The UE determines a reference point for phase difference between CRS and NRS. Using this reference point, and taking into account the current symbol timing, the UE applies a rotation to the CRS signal. Then, the UE can estimate the channel from the CRS and NRS signals together An alternative way to do this is by using the wideband (e.g., LTE) carrier frequency to downconvert, and rotating the NRS and NB data symbols by the corresponding phase in order to undo the rotation applied by the base station. While the UE may achieve the same effect of undoing the rotation of the NB signal in this manner rather than rotating the CRS, this example would require the UE to perform a phase rotation for not only NRS but also the NB data. Therefore, it may be more efficient for the UE to downconvert using the NB carrier frequency and rotate only the CRS.

Additionally, in another example, when a UE is not aware of a reference point at which a pattern of per symbol phase rotations begins at the base station, the UE may try to estimate the phase difference at a given point of time, and then from that point on determine the phase reference point. If the phase difference is known at any particular moment, then the UE may determine the remaining phase differences. This estimation can be performed by comparing the phase (after descrambling) of the CRS signal with respect to the NRS signal, for example.

Figure 4:
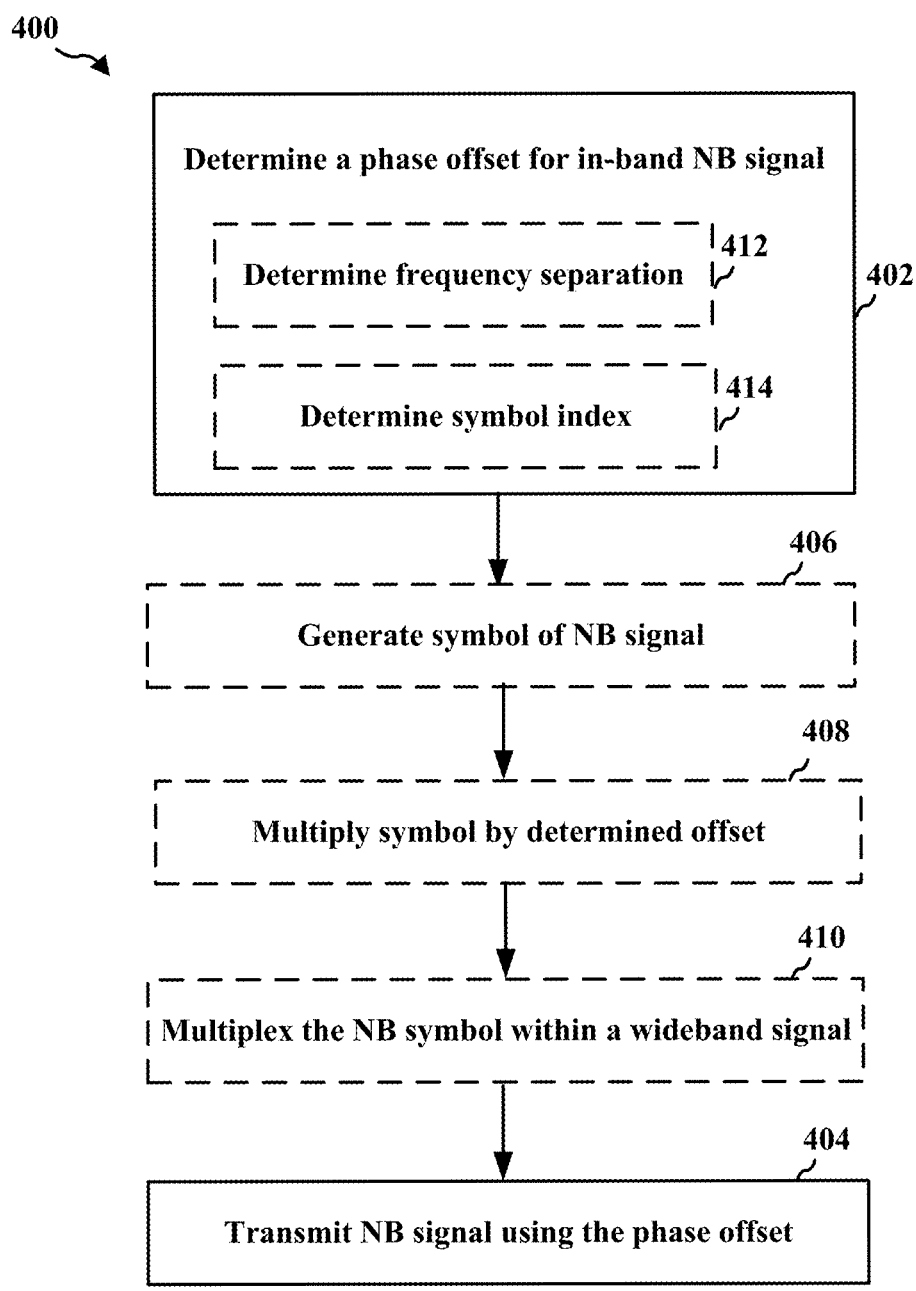
FIG. 4 is a flowchart of a method of wireless communication.

FIG. 4 is a flowchart 400 of a method of wireless communication. The method may be performed by a base station (e.g., the eNB 102, 180, 310, 850, the apparatus 502/502'). The base station may be configured to transmit a NB signal, such as an NB-IoT signal and may transmit the NB signal using wideband resources. For example, the base station may multiplex the NB signal within a wideband signal.

The center of frequency of the NB signal may be different than the frequency center of the wideband signal. Therefore, at 402, the base station determines a per symbol phase offset for the NB signal for transmission using the wideband resources, the phase offset having a relationship to a reference point in time, e.g., a fixed relationship as described in connection with FIG. 10. The NB signal may comprise an NB-IoT signal and the wideband resources may comprise LTE resources. The reference point may comprise, e.g., a reference symbol in the wideband resources. The relationship may correspond to an index relative to the reference symbol. For example, the base station may determine the phase offset as described in connection with equation (3) discussed above.

Then, at 404, the base station transmits the NB signal using the determined phase offset. By determining the phase offset of the NB signal relative to a wideband reference symbol, a receiving UE may use a knowledge of the wideband reference symbol along with the NB reference signal to perform channel estimation or otherwise assist with receiving the NB signal.

As a part of the method illustrated in FIG. 4, the base station may generate a first symbol of NB signal in the frequency domain at 406. Then, the base station may multiply the first symbol of the NB signal by a first determined phase offset at 408. The eNB may multiplex the first symbol of the NB signal within a wideband symbol of a wideband signal in the frequency domain at 410. Transmitting the NB signal at 404 may comprise transmitting the multiplexed signal from 410. The base station may similarly multiply a second symbol of the NB signal by a second predetermined phase offset, multiply a third symbol of the NB signal by a third predetermined phase offset, etc. in a pattern. At the next reference instance, the base station may repeat the pattern of per symbol phase offsets.

The phase offset at 402 may be based on a frequency separation between a first frequency center of the NB signal and a second frequency center of the wideband signal and a symbol index indicating a number of symbols from the reference point in time. Thus, the base station may determine a frequency separation between a first frequency center of the NB signal and a second frequency center of the wideband signal at 412. The base station may also determine a symbol index at 414, e.g., including determining a number of symbols from the reference point in time. Therefore, the phase offset may be determined using the frequency separation and the symbol index. The reference point in time may be comprised in a particular subframe, e.g., in an even numbered subframe. For example, the reference point in time may be a start of a last even-numbered subframe.

Figure 5:
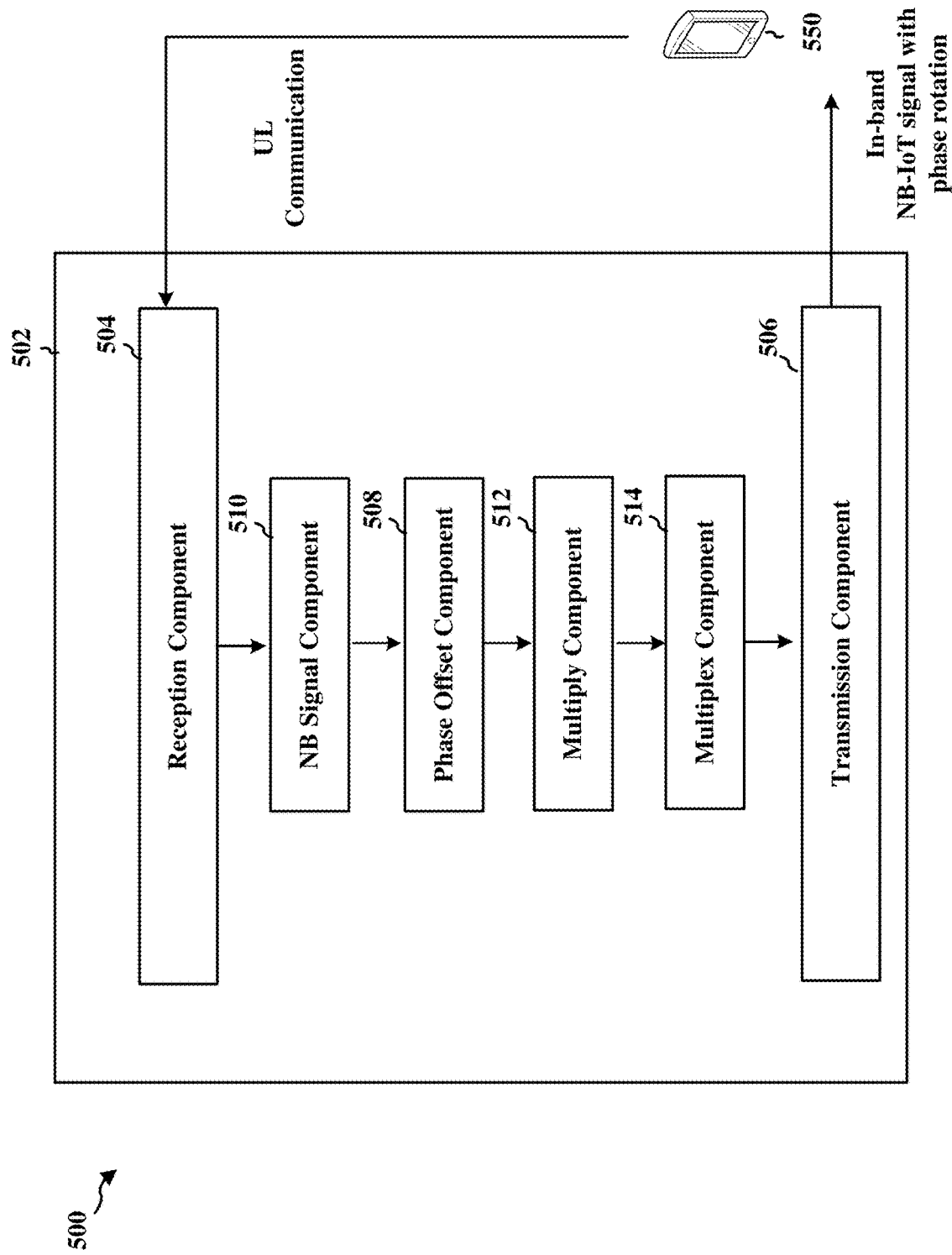
FIG. 5 is a conceptual data flow diagram illustrating the data flow between different means/components in an exemplary apparatus.

FIG. 5 is a conceptual data flow diagram 500 illustrating the data flow between different means/components in an exemplary apparatus 502. The apparatus may be a base station, e.g., eNB 102, 180, 310, 850. The apparatus includes a reception component 504 that receives UL communication from UE 550 and a transmission component 506 that transmits a signal, e.g., a DL signal to UE 550. UE 550 may correspond to UE 104, 350, apparatus 802, 802'. Transmission component 506 may transmit both a wideband signal and a NB signal. The NB signal may be transmitted within wideband resources. Apparatus 502 may also include an NB signal component 510 that generates symbols of a NB signal, phase offset component 508 that determines a phase offset for a NB signal for transmission using wideband resources, the phase offset having a fixed relationship to a reference point in time, a multiply component 512 that multiplies symbols of the NB signal by the phase offset determined by phase offset component 508, and a multiplex component 514 that multiplexes the symbol of the NB signal within a symbol of a wideband signal in the frequency domain.

Transmission component 506 may transmit each symbol of the NB signal using the corresponding determined phase offset, e.g., determined by phase offset component 508

The apparatus may include additional components that perform each of the blocks of the algorithm in the aforementioned flowchart of FIG. 4. As such, each block in the aforementioned flowcharts of FIG. 4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 6:
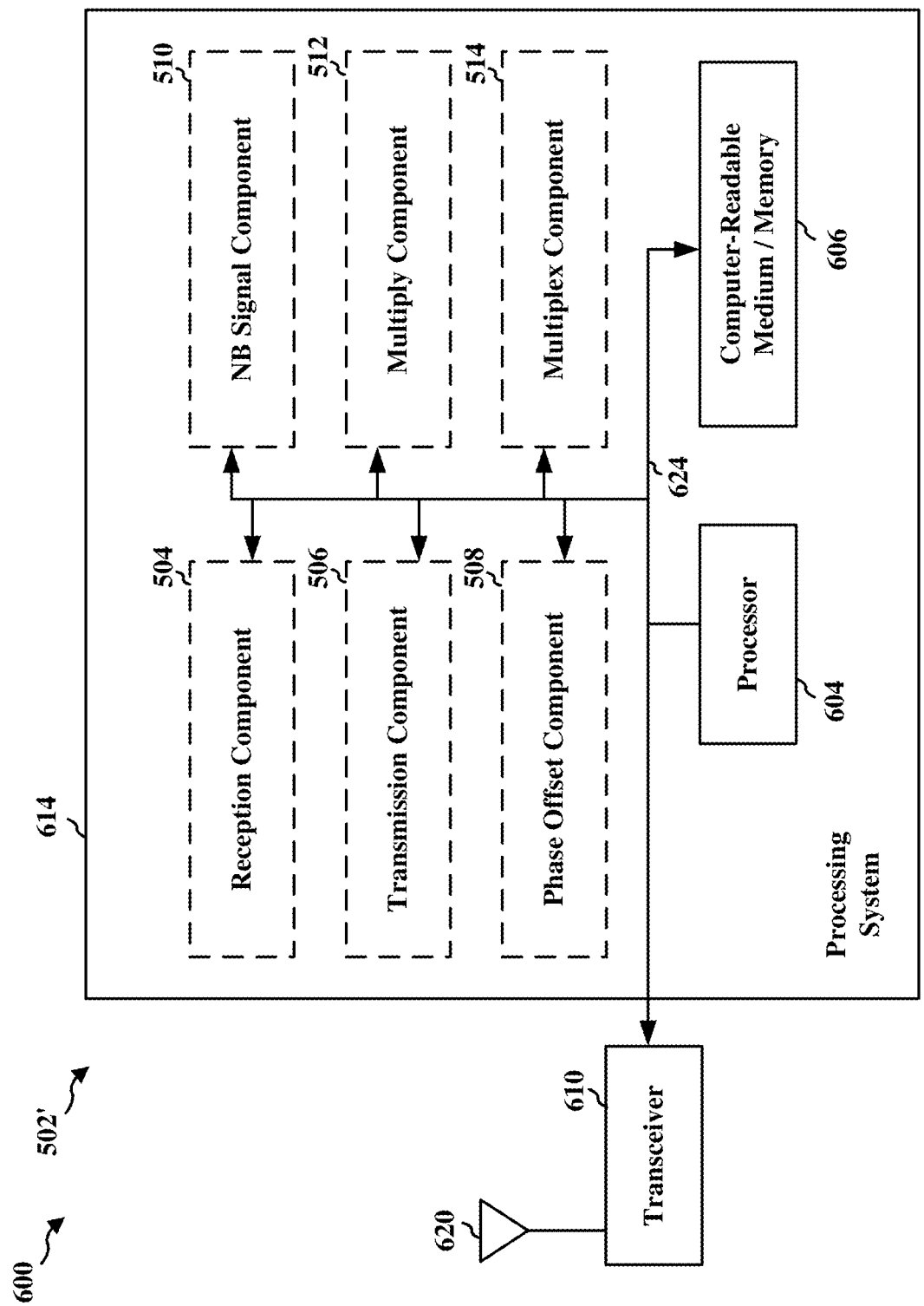
FIG. 6 is a diagram illustrating an example of a hardware implementation for an apparatus employing a processing system.

FIG. 6 is a diagram 600 illustrating an example of a hardware implementation for an apparatus 502' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the at least one processor 604, the components 504, 506, 508, 510, 512, 514 and the computer-readable medium/memory 606. The bus 624 may also link various other circuits such as timing sources, peripherals, voltage regulators, and power management circuits, which are well known in the art, and therefore, will not be described any further.

The processing system 614 may be coupled to a transceiver 610. The transceiver 610 is coupled to one or more antennas 620. The transceiver 610 provides a means for communicating with various other apparatus over a transmission medium. The transceiver 610 receives a signal from the one or more antennas 620, extracts information from the received signal, and provides the extracted information to the processing system 614, specifically the reception component 504. In addition, the transceiver 610 receives information from the processing system 614, specifically the transmission component 506, and based on the received information, generates a signal to be applied to the one or more antennas 620. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the components 504, 506, 508, 510, 512, 514. The components may be software components running in the processor 604, resident/stored in the computer readable medium/memory 606, one or more hardware components coupled to the processor 604, or some combination thereof. The processing system 614 may be a component of the eNB 310 and may include the memory 376 and/or at least one of the TX processor 316, the RX processor 370, and the controller/processor 375.

In one configuration, the apparatus 502/502' for wireless communication includes means for determining a phase offset, means for transmitting, means for generating a symbol of NB signal, means for multiplying a first symbol of the NB signal, and means for multiplexing the first symbol of the NB signal. The aforementioned means may be one or more of the aforementioned components of the apparatus 502 and/or the processing system 614 of the apparatus 502' configured to perform the functions recited by the aforementioned means. As described supra, the processing system 614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 7:
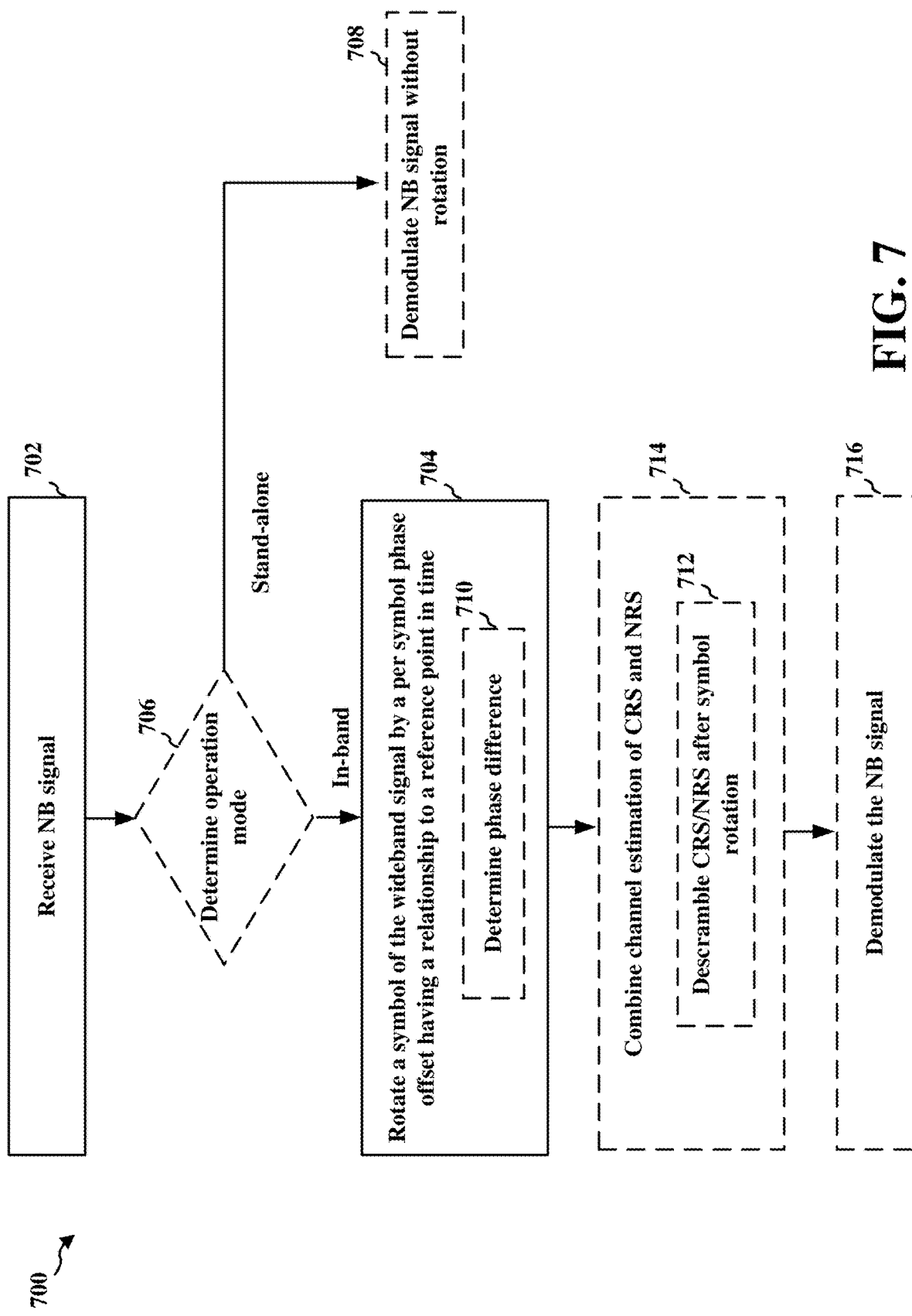
FIG. 7 is a flowchart of a method of wireless communication.

FIG. 7 is a flowchart 700 of a method of wireless communication. The method may be performed by a UE (e.g., the UE 104, 350, 550 the apparatus 802/802'). At 702, the UE receives a NB signal having a frequency location within a wideband signal from a base station (e.g., eNB 102, 180, 850, the apparatus 502, 502'). This may be, e.g., similar to the signal transmitted at 404 described in connection with FIG. 4.

In order to demodulate the received signal, the UE may rotate at least a portion of a symbol of the wideband signal by a per symbol phase offset at 704 having a relationship to a reference point in time, e.g., a fixed relationship. For example, the UE may determine a phase offset, such as described in connection with equation (3) for the base station. The reference point in time may comprise a reference symbol in the wideband signal. The relationship may correspond to an index relative to the reference symbol. The reference point may comprise an even numbered subframe, e.g., the reference point may comprise a start of a last even-numbered subframe. The NB signal may comprise an NB-IoT signal and the wideband signal may comprise an LTE signal.

The UE may determine at 706 an operation mode for NB signal reception. For example, the UE may determine whether the NB signal is an in-band deployment. If the UE determines the operation mode instead to be a standalone mode, the UE may refrain from performing the rotation, e.g., at 708. If the UE determines that the operation mode is in-band, the UE may then proceed to 704.

The symbol of the wideband signal may comprise a wideband reference signal, e.g., CRS, that is rotated relative a corresponding NB reference signal, e.g., NRS. The rotation applied at 704 may be applied to the CRS in order to remove the effect of a phase rotation applied to the NB at the base station. This enables the UE to use the wideband reference signal in combination with the NB reference signal, e.g., to perform channel estimation and/or otherwise assist in receiving the NB signal.

The relative rotation applied to the wideband reference signal may correspond to a frequency separation between a first frequency center of the NB signal and a second frequency center of the wideband signal and a symbol index. As illustrated in FIG. 10, a pattern of phase rotations may be applied by the base station to the NB signal on a per symbol basis, according to the difference between the frequency center of the two signals. Therefore, the UE may similarly apply the phase rotation based on the same difference in frequency centers according to the symbol index of the wideband reference signal.

The UE may determine a phase difference at 710 by comparing a first phase of a first set of resource elements and a second phase of a second set of resource elements. The rotation of the symbol of the wideband signal at 704 may be based at least on the determined phase difference. The first set of resource elements may comprise a CRS, and the second set of resource elements comprise an NRS.

The UE may combine a first channel estimation based on the CRS with a second channel estimation based on an NRS at 714 and demodulate the NB signal at 716 with the combined channel estimation. Determining the channel estimates may comprise descrambling, at 712, at least a portion of the CRS and the NRS after performing a symbol rotation for the corresponding reference signal. For example, the UE may descramble a portion of the CRS after performing the rotation of the symbol at 704.

Figure 8:
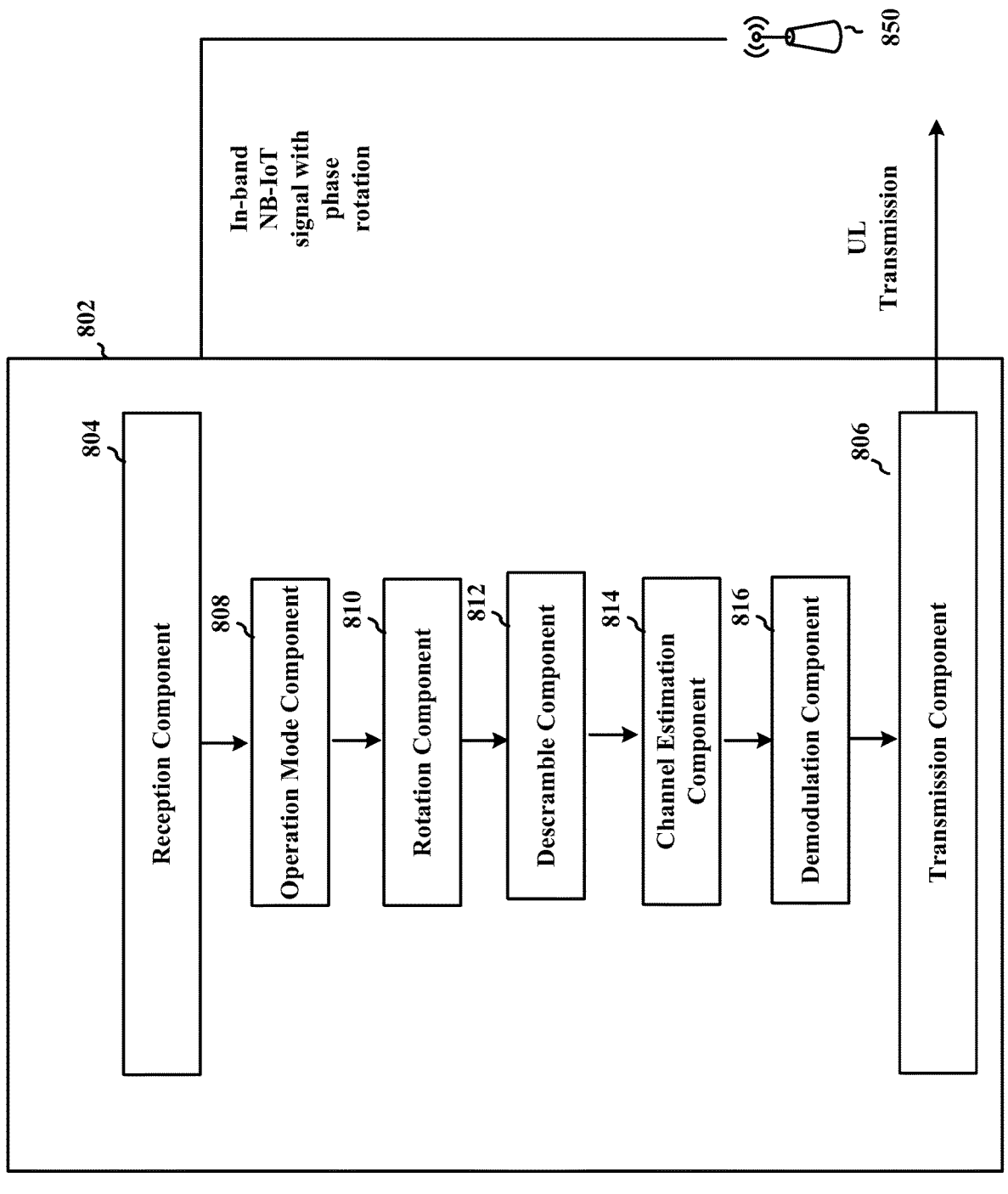
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a UE. The apparatus includes a reception component 804 that DL communication from base station 850, such as a NB signal having a frequency location within a wideband signal, and a transmission component 806 that transmits UL communication to base station 850. Apparatus 802 may also include a rotation component 810 that rotates a symbol of the wideband signal by a phase offset using a fixed relationship of the phase offset to a reference point in time, e.g., including the determination of a phase difference between the NB signal and the wideband signal. The apparatus 802 may include an operation mode component 808 that determines an operation mode for NB signal reception, a descramble component 812 that descrambles at least one of the wideband reference signal and the NB reference signal, a channel estimation component 814 that combines a channel estimation based on the CRS with a channel estimation based on an NRS, and a demodulation component 816 that demodulates the NB signal with the combined channel estimation.

The apparatus may include additional components that perform each of the blocks of the algorithm in the aforementioned flowchart of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
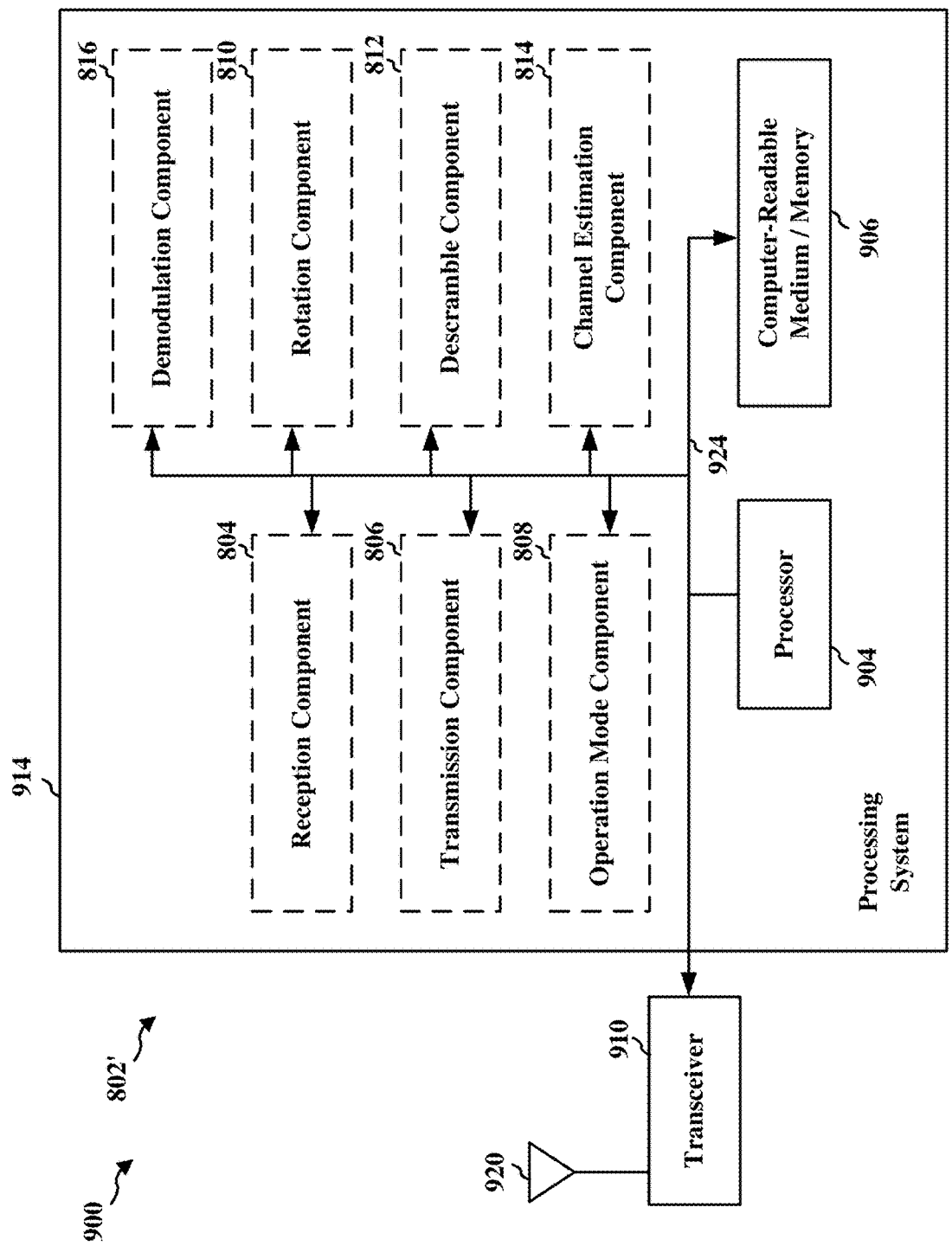
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, and 816 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, and 816. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for receiving, means for rotating a symbol of a wideband signal, means for determining an operation mode, and means for determining a phase difference. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communications at a base station comprising:
    determining a phase offset for a signal, the phase offset having a relationship to a reference point in time, wherein the reference point comprises a reference symbol and the relationship corresponds to an index relative to the reference symbol; and
    transmitting the signal using the determined phase offset.

2. The method of claim 1, wherein the phase offset is based on a frequency separation between a first frequency center of the signal and a second frequency center of a second signal and a symbol index indicating a number of symbols from the reference point in time, wherein a frequency range of the signal is within a frequency range of the second signal.

3. The method of claim 2, wherein the reference point in time is comprised in an even numbered subframe.

4. The method of claim 3, wherein the reference point in time is a start of a last even-numbered subframe.

5. An apparatus for wireless communication at a base station comprising:
    means for determining a phase offset for a signal, the phase offset having a relationship to a reference point in time, wherein the reference point comprises a reference symbol and the relationship corresponds to an index relative to the reference symbol; and
    means for transmitting the signal using the determined phase offset.

6. The apparatus of claim 5, wherein the phase offset is based on a frequency separation between a first frequency center of the signal and a second frequency center of a second signal and a symbol index indicating a number of symbols from the reference point in time, wherein a frequency range of the signal is within a frequency range of the second signal.

7. The apparatus of claim 6, wherein the reference point in time is comprised in an even numbered subframe.

8. The apparatus of claim 7, wherein the reference point in time is a start of a last even-numbered subframe.

9. An apparatus for wireless communication at a base station comprising:
    a memory; and
    at least one processor coupled to the memory and configured to:
        determine a phase offset for a signal, the phase offset having a relationship to a reference point in time, wherein the reference point comprises a reference symbol and the relationship corresponds to an index relative to the reference symbol; and
        transmit the signal using the determined phase offset.

10. The apparatus of claim 9, wherein the phase offset is based on a frequency separation between a first frequency center of the signal and a second frequency center of a second signal and a symbol index indicating a number of symbols from the reference point in time, wherein a frequency range of the signal is within a frequency range of the second signal.

11. The apparatus of claim 10, wherein the reference point in time is comprised in an even numbered subframe.

12. The apparatus of claim 11, wherein the reference point in time is a start of a last even-numbered subframe.

13. A non-transitory computer-readable medium storing computer executable code for wireless communication at a base station comprising code to:
    determine a phase offset for a signal, the phase offset having a relationship to a reference point in time, wherein the reference point comprises a reference symbol and the relationship corresponds to an index relative to the reference symbol; and
    transmit the signal using the determined phase offset.

14. A method for wireless communications at a user equipment (UE), comprising:
    receiving a first signal associated with a first frequency range; and
    rotating a symbol associated with a second signal by a per symbol phase offset having a relationship to a reference point in time;
    wherein the reference point comprises a reference symbol in the second signal, the relationship corresponds to an index relative to the reference symbol, and the first frequency range is within a second frequency range associated with the second signal.

15. The method of claim 14, wherein the reference point is comprised in an even numbered subframe.

16. method of claim 15, wherein the reference point is a start of a last even-numbered subframe.

17. The method of claim 14, further comprising:
    determining an operation mode for signal reception,
    wherein the symbol associated with the second signal comprises a second reference signal that is rotated relative to a corresponding first reference signal associated with the first signal.

18. The method of claim 17, wherein a relative rotation of the second reference signal corresponds to a frequency separation between a first frequency center of the first signal and a second frequency center of the second signal and a symbol index.

19. The method of claim 18, further comprising:
    determining a phase difference by comparing a first phase of a first set of resource elements and a second phase of a second set of resource elements, wherein the relative rotation of the symbol of the second signal is based at least on the determined phase difference.

20. An apparatus for wireless communication at a User Equipment (UE), comprising:
    means for receiving a first signal associated with a first frequency range; and
    means for rotating a symbol associated with a second signal by a per symbol phase offset having a relationship to a reference point in time;
    wherein the reference point comprises a reference symbol in the second signal, the relationship corresponds to an index relative to the reference symbol, and the first frequency range is within a second frequency range associated with the second signal.

21. The apparatus of claim 20, wherein the reference point is comprised in an even numbered subframe.

22. The apparatus of claim 21, wherein the reference point is a start of a last even-numbered subframe.

23. The apparatus of claim 20, further comprising:
    means for determining an operation mode for signal reception,
    wherein the symbol associated with the second signal comprises a second reference signal that is rotated relative to a corresponding first reference signal associated with the first signal.

24. The apparatus of claim 23, wherein a relative rotation of the second reference signal corresponds to a frequency separation between a first frequency center of the first signal and a second frequency center of the second signal and a symbol index.

25. The apparatus of claim 24, further comprising:
    means for determining a phase difference by comparing a first phase of a first set of resource elements and a second phase of a second set of resource elements, wherein the relative rotation of the symbol of the second signal is based at least on the determined phase difference.

26. An apparatus for wireless communication at a User Equipment (UE), comprising:
    a memory; and
    at least one processor coupled to the memory and configured to:
        receive a first signal associated with a first frequency range; and
        rotate a symbol associated with a second signal by a per symbol phase offset having a relationship to a reference point in time,
    wherein the reference point comprises a reference symbol in the second signal, the relationship corresponds to an index relative to the reference symbol, and the first frequency range is within a second frequency range associated with the second signal.

27. The apparatus of claim 26, wherein the reference point is comprised in an even numbered subframe.

28. The apparatus of claim 27, wherein the reference point is a start of a last even-numbered subframe.

29. The apparatus of claim 26, wherein the at least one processor is further configured to:
    determine an operation mode for first signal reception,
    wherein the symbol associated with the second signal comprises a second reference signal that is rotated relative to a corresponding first reference signal associated with the first signal.

30. The apparatus of claim 29, wherein a relative rotation of the second reference signal corresponds to a frequency separation between a first frequency center of the first signal and a second frequency center of the second signal and a symbol index.

31. The apparatus of claim 30, wherein the at least one processor is further configured to:
    determine a phase difference by comparing a first phase of a first set of resource elements and a second phase of a second set of resource elements, wherein the relative rotation of the symbol of the second signal is based at least on the determined phase difference.

32. A non-transitory computer-readable medium storing computer executable code for wireless communication at a User Equipment (UE), comprising code to:
    receive a first signal associated with a first frequency range; and
    rotate a symbol of the associated with a second signal by a per symbol phase offset having a relationship to a reference point in time,
    wherein the reference point comprises a reference symbol in the second signal, the relationship corresponds to an index relative to the reference symbol, and the first frequency range is within a second frequency range associated with the second signal.

\* \* \* \* \*